3,097,953
SORBITOL TREATMENT OF POULTRY
Thomas William Humphreys, Plainfield, N.J., assignor to Merck & Co., Inc., Rahway, N.J., a corporation of New Jersey
No Drawing. Filed Jan. 14, 1959, Ser. No. 786,691
1 Claim. (Cl. 99—194)

This invention relates to the treating of fowl, such as for example chicken, to condition it for marketing. The invention is particularly concerned with treating fowl so as to better suit it for preservation by maintaining it at a reduced temperature.

An undesirable consequence of preserving fowl at reduced temperatures is the occurrence of what has come to be known as freezer burn. This is a general reduction in bloom and commonly involves dehydration, a dried out appearance and/or the appearance of opaque white areas over the skin of the fowl. Another occurrence upon storage is the exuding of a liquid having a reddish tint. This reddish weepage is undesirable at it detracts from the appearance of the fowl.

It has been proposed heretofore to prevent freezer burn by packaging the birds in airtight transparent plastic bags. In this method, the bird is placed in a plastic bag, the bag is sealed and partially evacuated and is then heat shrunk around the bird. This method of packaging, while it has met with some measure of success in that it is used to inhibit freezer burn, has several disadvantages. Thus packaging in such manner is costly, and the plastic film has a tendency to become embrittled, crack and rupture. Moreover, weepage collects in the bag and detracts from the appearance of the fowl.

It has now been discovered, surprisingly, that fowl can be conditioned for marketing by applying sorbitol to the skin of the fowl. This treatment is advantageous in that it reduces susceptibility of the fowl to freezer burn. Moreover, it eliminates or significantly reduces coloration of weepage. Another advantage of the treatment of the invention is that the time required for thawing of treated birds is substantially less than that of untreated birds.

Sorbitol is the preferred treating agent as significantly better results, particularly with respect to freezer burn, have been obtained with sorbitol.

The fowl can be any edible bird for example poultry such as chickens, cocks, hens, turkeys, ducks, etc. The treatment is particularly advantageous when applied to chickens. Usually, the fowl, when subjected to the treatment, will be dressed, i.e. cleaned so as to be in condition for cooking, and the whole carcass or a carcass member such as a wing, breast or half carcass, etc. can be treated.

The treatment is most effective in treating fowl which, in the course of dressing, is not hard scalded. It has been found, for example, that the treatment is not effective to significantly reduce freezer burn in the case of tom turkeys, which are hard scalded in the normal course of the preparation thereof. This ineffectiveness may be due to the fact that during hard scalding the cuticle is removed.

The treatment can be performed immediately following dressing of the fowl and while it is in unfrozen condition, and preservation can then be effected by maintaining the poultry for a time in frozen condition.

The sorbitol can be applied in any convenient manner adapted to distribute it over the entire surface of the skin of the carcass member being treated. Thus, the sorbitol in pure form can be rubbed on or can be applied as an aqueous solution by spraying, brushing or rubbing, or the fowl can be dipped in an aqueous solution. The amount of sorbitol applied to chickens, for example, can be, in general, about 2½–5 grams per chicken. These amounts are not critical and smaller amounts, at the expense of possibly reduced effectiveness, can be used. The use of larger amounts, in general, does not significantly increase the effectiveness of the treatment and can impart a taste to the fowl.

In a preferred embodiment, the sorbitol is applied as an aqueous solution. Suitable concentrations of the sorbitol in aqueous solutions thereof are above about 10% by weight of the polyhydric agent. Concentrations in the range of 25% to 50% by weight are preferred. Higher concentrations, i.e. 70% by weight, can be employed. In the case of sorbitol, however, the use of the higher concentrations has the disadvantage that it is difficult to limit the amount of sorbitol taken up by the bird so that the flavor is not adversely affected.

Heretofore in the preserving of fowl, a practice has been to cool the birds in ice water for about 24 hours to cool the fowl to about freezing temperature and then subjecting the fowl to a below freezing temperature to effect the desired freezing. It has been found that treatment according to the invention is advantageously combined with this known treatment in the manner that the birds after being cooled for about 24 hours in ice water and dipped in an aqueous solution of the treating agent and then frozen.

It has been found that markedly better results are obtained when the treatment is carried out in this manner rather than by immersing the birds in a cold aqueous solution of the treating agent to effect the pre-cooling. Pre-cooling in cold aqueous solution of the treating agent results in a reddening of the flesh which is undesirable.

In treating according to the invention, i.e. by dipping in treating agent after pre-cooling in ice water, immersion of the birds in the treating agent need only be for a short time. It is necessary only that the sorbitol solution wet the skin of the bird so that the sorbitol is taken up by the skin. Immersion times of about a minute or even less are satisfactory. The temperature of the aqueous treating agent solution is advantageously about the temperature of the water bath in which the birds are pre-cooled.

The treatment according to the invention offers the advantages that it is inexpensive, yet effective, and permits packaging fowl in a convenient manner. Thus, dressed fowl or carcass members according to the invention, i.e. having applied to the skin thereof sorbitol in an amount effective to inhibit freezer burn and weepage of reddish liquid, can be packed either as whole carcasses or cut up, individually or in groups, in paper containers or wrapped in transparent plastic sheeting, or stored unwrapped. If desired, the treatment can be combined with other treatments intended to inhibit freezer burn, such as the above-described use of heat-shrunk transparent plastic sheeting for enclosing the birds in airtight packages.

*Example 1*

Fresh-killed, dressed chickens (2–2½ lbs.) were split in half longitudinally along the dorso ventral axis. One half of each bird was dipped in a solution of 70% sorbitol and drained. The treated and untreated halves were placed in cardboard containers and stored unwrapped in the frozen state for one week and then examined. The samples were then removed from storage and it was found that the treated samples were readily distinguished from the untreated, being of better color, showing no evidence of dehydration or discoloration, and being more easily separable from the containers. When the samples were fried in olive oil and tasted, only 1 out of 8 individuals noted a difference in flavor between treated and untreated samples. This difference was referred to as an olive oil flavor and appeared to be associated with the treated samples tasted.

Example 2

One-half of each of three fresh-killed, dressed chickens (2–2½ lbs.) was dipped in a solution of 70% sorbitol, drained, and each was placed in an individual cardboard tray. The untreated half of each bird served as control. This procedure was repeated using 50% and 30% solutions of sorbitol. The chicken halves were stored un-wrapped in the frozen state for 47 days and were thereafter removed from storage and were examined for appearance. The surface of the frozen control samples appeared markedly drier than the surface of the frozen samples treated with sorbitol. The appearance of the thawed treated and untreated samples was about the same and no significant difference was noted. The treatment with 30% sorbitol solution appeared to be superior to the treatment with 50 to 70% sorbitol.

The legs on some of the chicken halves were cut off at the hip joint, fried in Wesson oil and subjected to a taste panel comprising 5 individuals. Only 2 out of 5 individuals noted a difference in flavor between treated and untreated samples. This was at the 50 and 70% levels of sorbitol. There was no particular preference for the untreated over the treated samples.

Example 3

Six chicken breasts were split in half lengthwise. One half of each breast was dipped in a 70% solution of sorbitol and drained. These were then packed together in a single cardboard tray. The procedure was repeated with the remaining half of each breast. Using additional breasts, similar treatments were carried out using 50% and 30% solutions of sorbitol. Untreated breasts served as control. The chicken breasts were stored un-wrapped in the frozen state for 41 and 46 days and were thereafter removed from storage and were examined for appearance. The frozen treated samples were superior in appearance to the frozen untreated samples. The appearances of the thawed treated and untreated samples were not greatly different, the untreated samples being slightly inferior. Among the treated samples there was little difference in appearance in relation to the effect of different concentrations of sorbitol.

Only one of the members of a taste panel comprising 6 individuals was able to differentiate between treated and untreated samples which had been stored for 41 days. The treated samples were preferred. Only 2 out of 8 individuals could differentiate between the treated and untreated samples which had been stored for 46 days. The untreated samples were preferred over the treated only when the treatment with sorbitol was at the 70% level.

Example 4

Six chicken wings were dipped in a 70% solution of sorbitol, drained, and packed in a cardboard tray. The procedure was repeated using 50% and 30% solutions of sorbitol. Six untreated wings served as control. The chicken wings were stored unwrapped in the frozen state for 40 days and were then removed from storage and were examined for appearance before and after thawing. Representative samples were fried in Wesson oil and tasted to determine any flavor difference existing among treated and untreated samples.

In each case the wings treated with sorbitol were superior in appearance to the untreated controls both before and after thawing. However, the 30% and 50% sorbitol treatments gave markedly better results than the 70% treatment. Only the wings treated with 50% and 30% sorbitol were considered marketable.

None of the members of a taste panel comprising 6 individuals was able to differentiate between treated and untreated samples.

Example 5

Dressed chickens in lots of 5 weighing about 2 lbs. each were treated with sorbitol by immersion for 30–60 seconds in an approximately 30% aqueous sorbitol solution at about 40–50° C. and then allowed to drain while suspended from a wing, vent down to permit better drainage. The immersion temperature does not appear to be critical. They were then packaged in lots of 5 in hotelpack, corrugated, cardboard cartons, each having a loose, wax paper liner which was folded over the birds prior to closing the carton with staples. The gross weight of each package was about 10 lbs. 4 oz. Untreated chickens were run as control. The packages were stored in the freezer. Upon removal from storage of 3 cartons of untreated chickens and 3 cartons of treated chickens for the purpose of examining for freezer burn by comparing appearances, it was observed that the untreated birds were burned to a substantially greater extent than were the treated birds.

After 30 days storage the samples were examined to determine weepage. The ice in the bottom of the control packages was bloody whereas the ice on the bottom of packages of treated birds was not bloody. This indicates that the treatment inhibits weepage coloration.

The loss in weight of the untreated birds was over 10% greater than for the treated birds.

Example 6

Six tom turkeys were treated in the manner in which the chickens of Example 5 were treated, and were then enclosed in heat-shrunk plastic coverings in the manner described hereinbefore. Six untreated toms were used as controls. The toms had been hard scalded. The birds were stored in frozen condition for 30 days and were then examined for weepage. The ice of the untreated birds was hard and had a reddish tint while that of the treated birds was white and soft. It appeared that weepage in the case of the treated birds was much less than for the untreated birds. The loss of weight for the treated birds was less, in some cases about 10% less.

The use of 30% sorbitol in these experiments did not appear to inhibit freezer burn as this was about the same for the treated and the untreated birds.

Example 7

Chicken breasts were treated with sorbitol in the manner described in Example 5 except in this case the breasts were drained by resting them on a clean piece of muslin stretched out over a wire screen. Other breasts were used as controls and all samples were stored in frozen condition for 30 days and were then removed and observed for weepage. The results were about the same as those described in Example 5.

Example 8

In this example the effectiveness of the method of the invention wherein the birds are pre-cooled in ice water, then dipped in an aqueous solution of treating agent, and then frozen, is demonstrated.

A first group of fryers was pre-cooled by maintaining them immersed in ice water for 24 hours. The pre-cooled birds were then hung on a line for 10 minutes to drain and following this were immersed in a 30% solution of sorbitol for about 1 minute. The sorbitol solution was maintained at about 40–50° C. Following the sorbitol treatment the birds were again hung on a line, and were allowed to drain for about 5 minutes and some of the birds were packed in wax paper lined cardboard cartons, 12 to a carton and others were packed in waxed paper lined celery crates, 24 to a crate. The packaged birds were then frozen and maintained in this condition for 41 days.

In order to evaluate the effectiveness of the treatment, similar experiments were run in which pre-cooling only and without the sorbitol treatment was employed, and in which the pre-cooling was effected by immersing the birds for 24 hours in an ice cold aqueous 30% sorbitol solution. In the case of the last mentioned experiments, of course, no further sorbitol treatment followed the pre-cooling.

Following removal of the birds from storage and before thawing, it was found that the birds treated according to the invention by pre-cooling and then treating with sorbitol, appeared to be in good condition and displayed little freezer burn. The freezer burn displayed was localized in a few of the areas adjacent the walls of the containers. Ice in the bottom of the containers, in most cases, appeared quite white.

The birds pre-cooled only and not treated with sorbitol, following the storage and before thawing displayed extensive freezer burn, and the ice in the bottom of the containers was light red.

The birds pre-cooled in sorbitol solution, following the storage and before thawing displayed some freezer burn and the flesh was a reddish or darkened color. This discoloring of the skin rendered these birds inacceptable for marketing. The ice in the containers was quite white.

After thawing of the birds of this example, there was little difference in appearance between the birds subjected to the various treatments. After thawing, the weepage of the birds pre-cooled in sorbitol solution was redder than weepage from the other birds. The birds treated with sorbitol, thawed faster than did the others. In some cases the difference in the time required for thawing was as much as 2 hours.

What is claimed is.

The method of preserving a dressed poultry carcass member, which comprises pre-cooling the carcass member by maintaining it immersed in ice water for a time sufficient to cool it to about freezing temperature, dipping the resulting pre-cooled carcass member in an aqueous solution containing about 10% to about 50%, by weight, of sorbitol, in order to apply the sorbitol to the skin of the carcass member, whereby susceptibility of the poultry to freezer burn is reduced, and thereafter freezing the carcass member.

References Cited in the file of this patent

UNITED STATES PATENTS

| | | |
|---|---|---|
| 2,019,756 | Knowlton et al. | Nov. 5, 1935 |
| 2,183,173 | Segura | Dec. 12, 1939 |
| 2,611,708 | Owens et al. | Sept. 23, 1952 |
| 2,884,328 | Johnson | Apr. 28, 1959 |